United States Patent [19]

Trevorrow et al.

[11] 4,197,106

[45] Apr. 8, 1980

[54] METHOD AND APPARATUS FOR ASYMMETRIC COOLING IN A GLASS SHEET FORMING CHAMBER

[75] Inventors: Thomas R. Trevorrow, Ford City; Robert Gagne; Joseph A. Gulotta, both of New Kensington, all of Pa.

[73] Assignee: PPG Industries, Inc., Pittsburgh, Pa.

[21] Appl. No.: 941,826

[22] Filed: Sep. 11, 1978

[51] Int. Cl.² ............................................. C03B 18/02
[52] U.S. Cl. .................................. 65/99 A; 65/182 R
[58] Field of Search ........................... 65/99 A, 182 R

[56] References Cited

U.S. PATENT DOCUMENTS

| | | |
|---|---|---|
| 3,223,503 | 12/1965 | Barradell-Smith et al. ........ 65/99 A |
| 3,241,937 | 3/1966 | Michalik et al. ........................ 65/34 |
| 3,409,423 | 11/1968 | De Lajarte .............................. 65/9 A |
| 3,733,190 | 5/1973 | Lawrenson et al. ..................... 65/91 |
| 3,894,859 | 7/1975 | Scott et al. ........................... 65/99 A |
| 3,930,829 | 1/1976 | Sensi .................................... 65/99 A |
| 4,092,140 | 5/1978 | Cerutti et al. ........................ 65/99 A |
| 4,116,659 | 9/1978 | Matesa et al. ........................ 65/99 A |

*Primary Examiner*—Arthur D. Kellogg
*Attorney, Agent, or Firm*—Paul A. Leipold

[57] ABSTRACT

A method and apparatus for the controlling of longitudinal distortion of float glass is disclosed. It is disclosed that longitudinal distortion may be reduced by asymmetric cooling beneath the molten metal bath of a float glass forming chamber.

11 Claims, 8 Drawing Figures

METHOD AND APPARATUS FOR ASYMMETRIC COOLING IN A GLASS SHEET FORMING CHAMBER

BACKGROUND OF THE INVENTION

1. Field of the Invention

This invention relates to method and apparatus for manufacture of a continuous sheet of flat glass by supporting molten glass in a pool of molten metal and advancing it along the surface of the pool of molten metal while cooling it to form a continuous sheet of flat glass. More particularly, this invention relates to a temperature control system for regulating the flow of tin within the molten metal bath on which the glass is formed.

2. Brief Description of the Prior Art

It has been recognized in the Prior Art that the forming chamber containing the molten tin bath acts to remove heat from the molten glass and cause it to solidify. Various temperature regulation means for the forming chamber have been suggested.

U.S. Pat. No. 3,733,190 to Lawrenson discloses thermal regulators in contact with the molten metal bath.

In U.S. Pat. No. 3,241,937 to Michalik et al a bath containing cooling elements embedded in the refractory bottom of the bath is disclosed.

In U.S. Pat. No. 3,409,423 to deLajarte it is disclosed that cooling units may be installed transverse of the tank holding the molten metal bath.

U.S. Pat. No. 3,930,829, a modification of the float glass process wherein the glass is lifted vertically from the bath, discloses a short bath chamber in which cooling members are embedded within the bottom refractory of the float glass forming chamber.

In U.S. Pat. No. 3,223,503 to Barradell-Smith et al a process for regulating the path of the glass ribbon in a float chamber by selective cooling is disclosed. The cooling is carried out at the surface of the bath near the ribbon edge to create currents that will shift the path of the glass ribbon.

As can be seen from the above references the regulation of the temperature of the molten metal bath in a forming chamber by cooling members is known. However, while temperature regulation by both cooling and heating means is known and has led to improved glass they have not served to overcome the problem of longitudinal defects caused by uneven thickness of the glass that results because of uneven temperatures transversely across the glass during the ribbon forming of the float formation process. The methods of the prior art all use symmetrical cooling either as temperature regulating means in the molten metal bath or embedded in the bottom of the bath. The cooling or other heat regulation means form convection currents within the molten metal that forms the bath. These currents are symmetrical on either side of the center line of the forming chamber. These convection currents created by the symmetrical temperature regulating means in combination with the molten metal current created by the glass movement tends to contribute to longitudinal defects of the glass as the currents within the molten metal tend to produce a temperature effect at the middle of the molten metal bath that is different from that at the edges of the bath. Therefore, there is a need for a float glass formation process that will eliminate the difficulty of a temperature gradient across the transverse direction of the glass as it moves through the forming chamber. There is a need to eliminate temperature gradients of the glass ribbon in the transverse direction caused by the current in the molten metal that is closely adhered to the bottom of the glass during its movement in the bath.

SUMMARY OF THE INVENTION

It is an object of this invention to overcome the disadvantages of prior methods and apparatus.

It is a further object of this invention to produce float glass of high optical quality.

It is a further additional object of this invention to minimize the lateral thickness contour of the glass ribbon.

It is an additional object of this invention to minimize longitudinal defects in float glass.

It is another further object of this invention to reduce distortion caused by thickness differences across float glass.

It is again an additional object of this invention to improve the optical qualities of float glass.

These and other objects of the invention are generally accomplished by causing an asymmetric transverse current flow in the molten metal bath of a float glass forming chamber. Asymmetrical flow of the molten metal is generally accomplished by the use of a cooling device either embedded in the bottom of the forming chamber below the glass ribbon or placed in contact with the molten metal bath below the glass ribbon. In a preferred embodiment of the invention cooling means are embedded in the refractory bottom of the forming region of the forming chamber. The cooling means preferably comprise a conduit for circulation of water that is located near the upper surface of the refractory forming bottom of the forming chamber.

DESCRIPTION OF THE PREFERRED EMBODIMENTS

Figure 1:
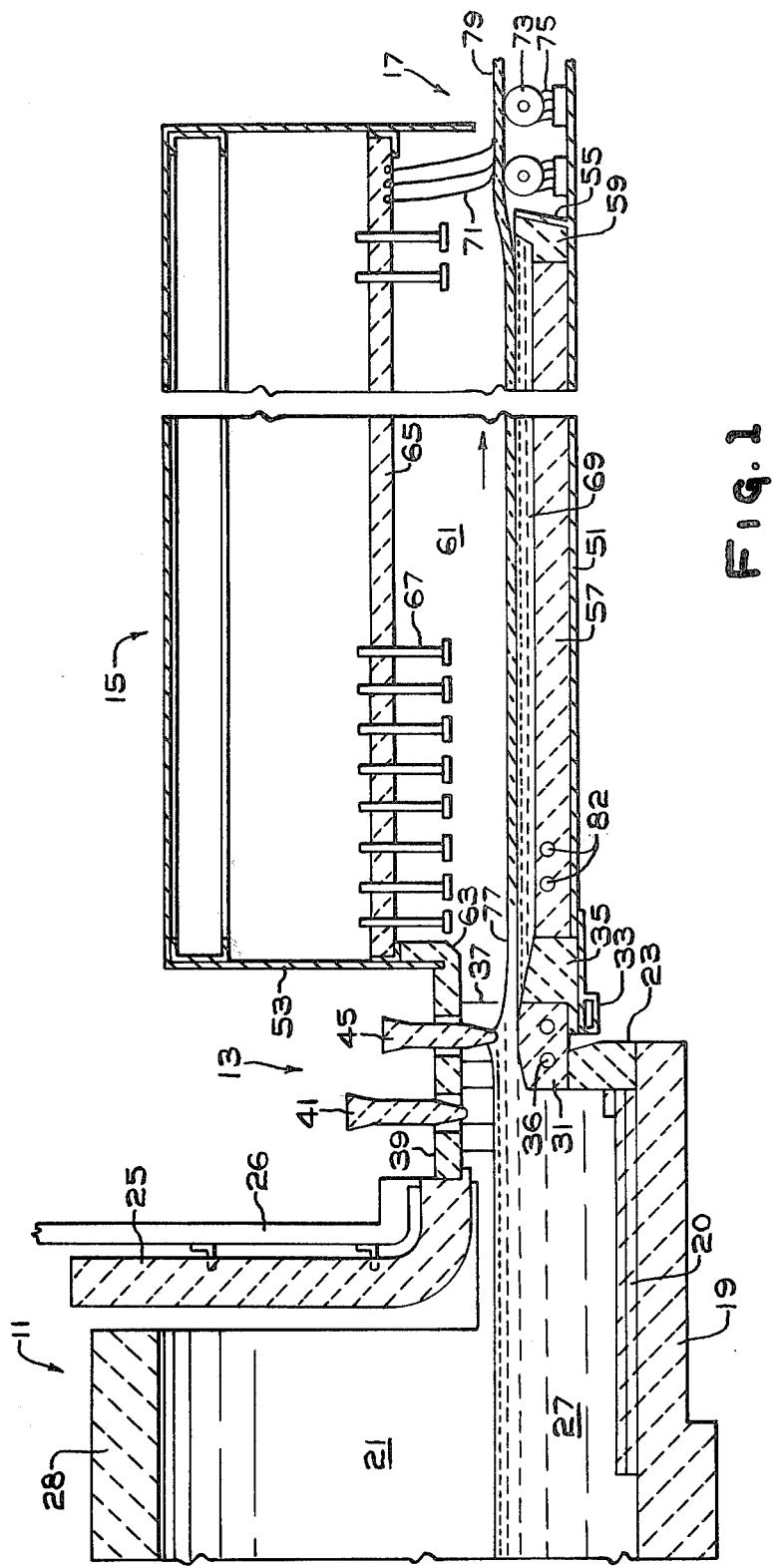
FIG. 1 is a sectional elevation view of an apparatus for producing flat glass in accordance with this invention.
Figure 2:
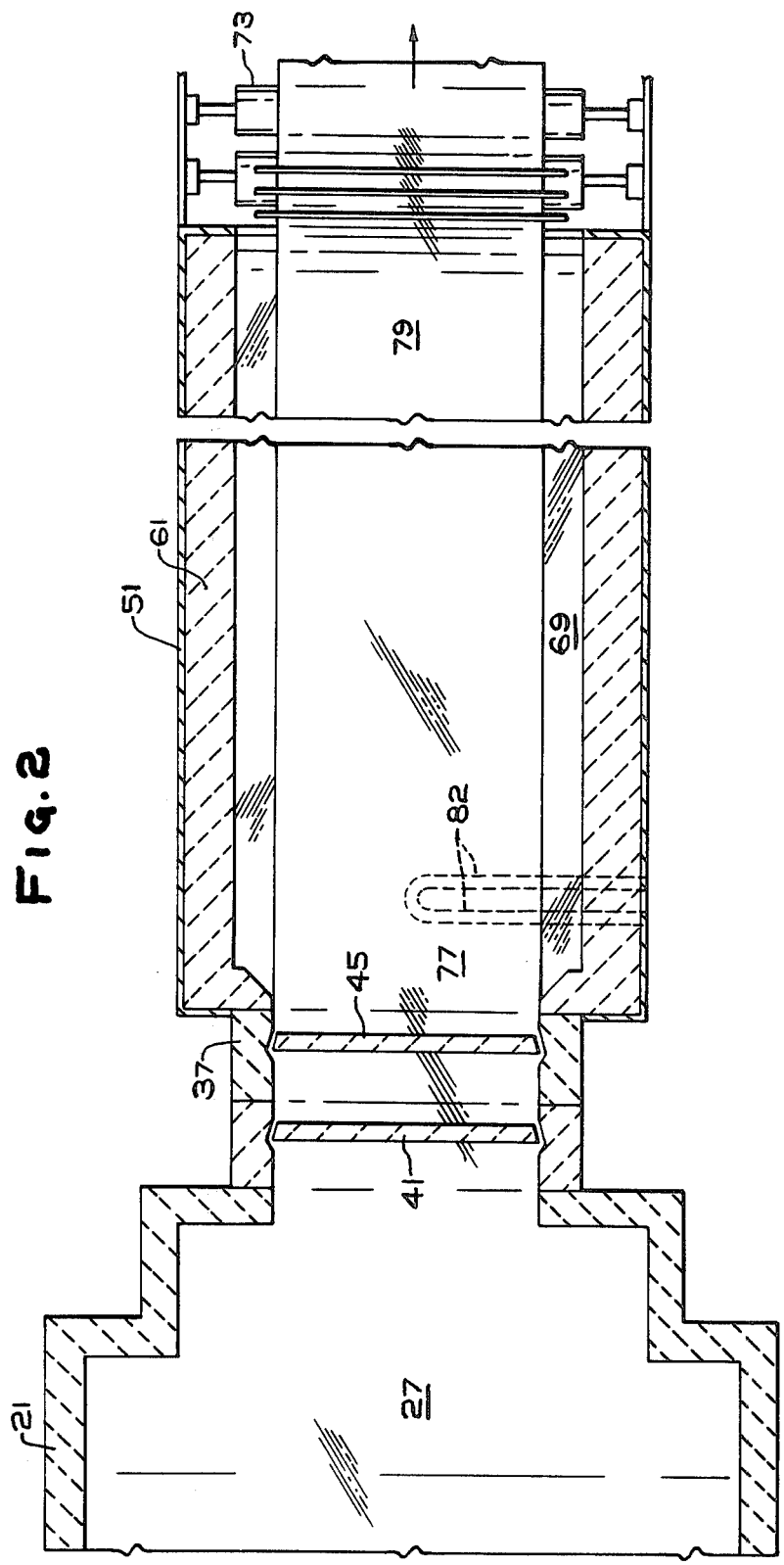
FIG. 2 is a sectional plan view of the apparatus shown in FIG. 1.
Figure 3:
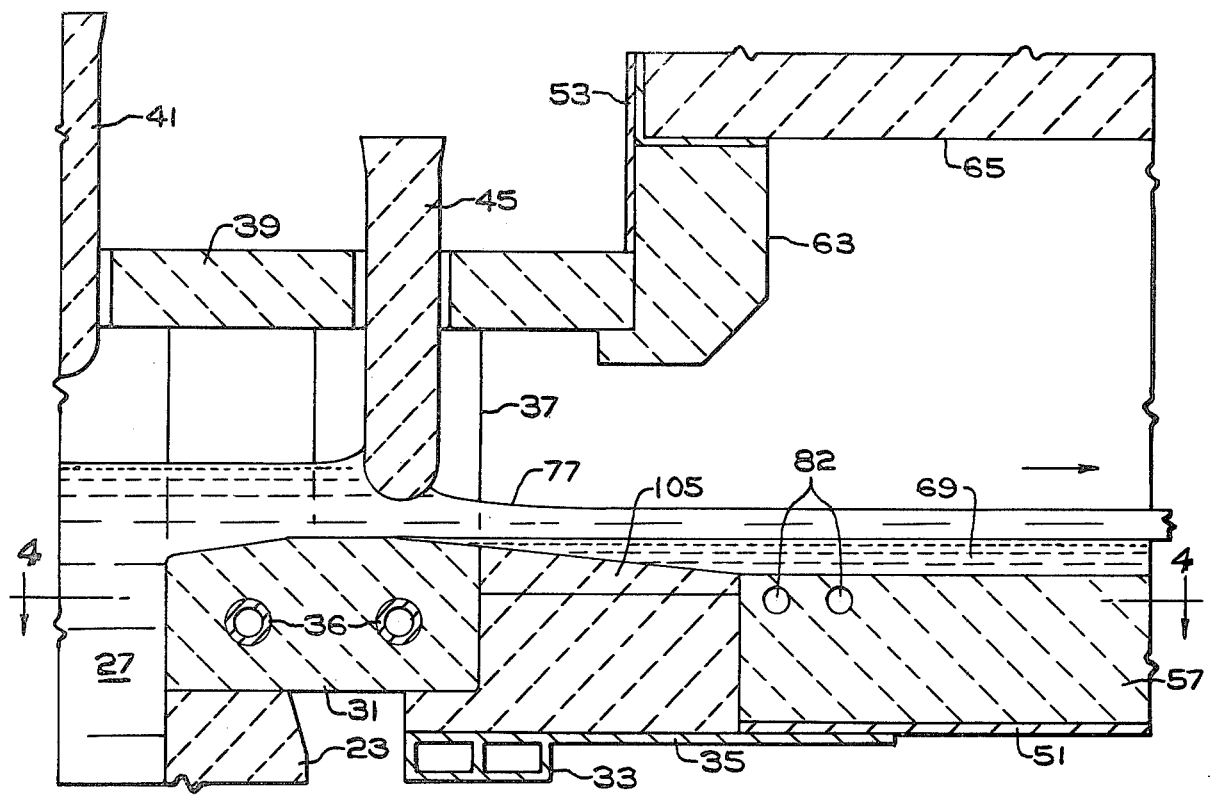
FIG. 3 is a partial sectional elevation view of the delivery facility and upstream end of the forming chamber shown in FIG. 1 illustrating the preferred location of the cooling device of the invention.
Figure 4:
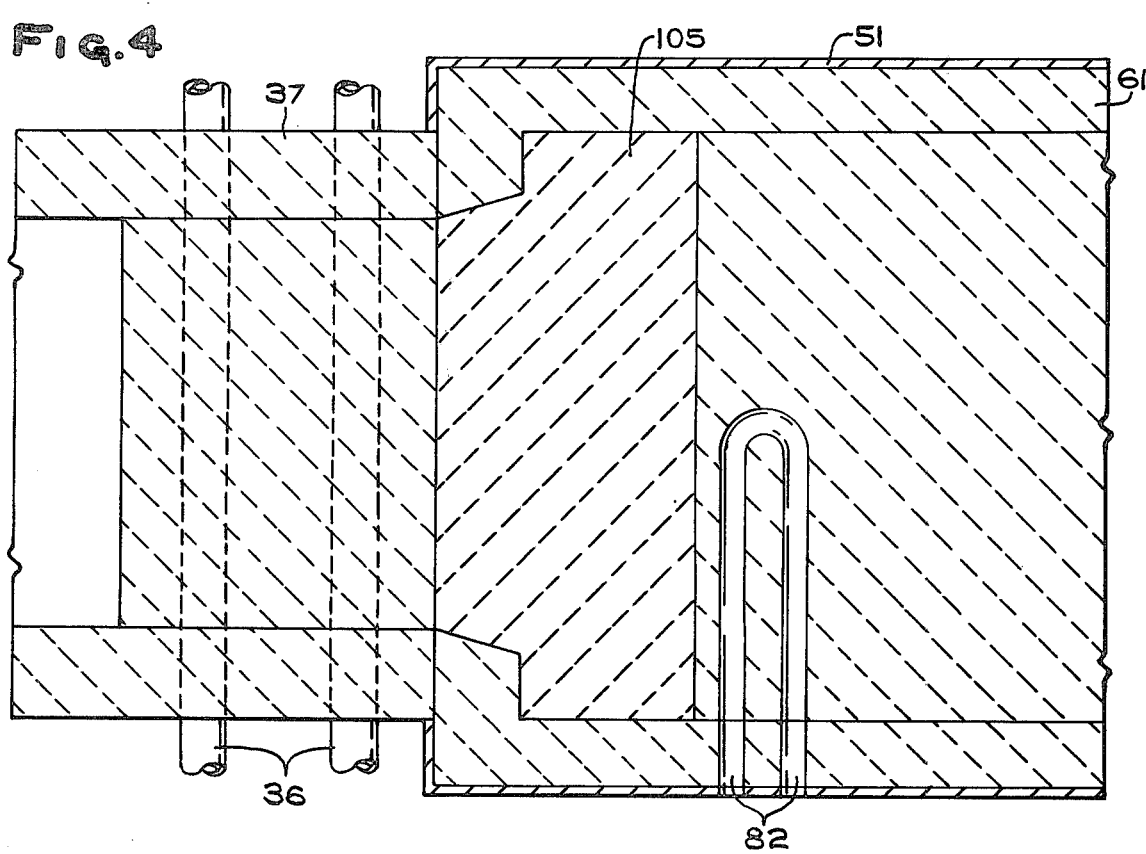
FIG. 4 is a partial sectional plan view of the delivery facility and upstream end of the forming chamber seen in FIG. 3 taken along the section line 4—4 of FIG. 3.

Referring now to FIGS. 1 and 2 there is shown a view of a suitable apparatus for carrying out the present invention. The glassmaking apparatus comprises a furnace 11, delivery means 13 and a forming chamber 15 and a glass removal facility 17. It will be understood that the lifting and conveying apparatus employed in the practice of this invention may be designed to cause the glass to be conveyed along either a horizontally extending path as shown or along an upwardly extending path.

The glassmaking furnace 11 includes a melting section (not shown) and a refiner or conditioner, the end of which is shown. The refining or conditioning section of the furnace 11 comprises a furnace bottom 19 preferably with a raised section 20, side walls 21 and a front basin wall 23. The furnace further comprises an upper front wall 25 which preferably is suspended or supported from above by a structural support 26 and a roof 28 overlying the upper portion of the furnace. A pool of molten glass 27 is maintained in the furnace.

The delivery means 13 includes a threshold 31 resting on a cooling block 33 or other support. A cast refractory seal 35 or the like is disposed between the threshold 31 and the cooling block 33. Extending through the holes in the threshold are conduits or pipes 36 for transporting coolant or the like through the interior of the threshold 31 and for controlling its temperature during use. At the ends of the threshold 31 there are side wall portions or jambs 37 on the sides of the channel through which molten glass may be delivered from the pool of molten glass 27 residing in the bottom portion of the furnace 11. The top of the delivery means 13 is defined by a roof 39. The roof is preferably a flat arch which is supported by supporting means (not shown) extending above it and connected to flat arch supporters embedded in the flat arch itself. Extending transversely across the delivery means 13 are two gates or tweels. The first tweel is a backup tweel 41 connected to a support assembly (not shown) for raising or lowering it into engagement in the pool of molten glass 27. The second tweel is a control tweel 45 supported by support assembly (not shown) for raising and lowering the tweel. The tweel is held in operating position in contact with the molten glass to be delivered for forming. The control tweel 45, along with the threshold 31 and the jambs 37, define an opening through which a layer of molten glass may be delivered for forming.

The forming chamber 15 comprises a bottom casing 51. This casing is preferably a casing constructed of metal, such as steel. The casing is preferably impervious to the molten metal in the chamber. The forming chamber 15 further comprises a top casing 53 including a top, ends and side portions. The top casing is also preferably constructed of impervious metal. An end piece or lip casing 55 is disposed across the forming chamber at its downstream end and, connected to the bottom casing 51. Disposed within the bottom casing 51 is a refractory bottom 57, preferably the bottom has been cast in place inside the bottom casing 51 between the inlet end bottom 35 and an exit lip 59 mounted or cast against the lip casing 55.

The forming chamber 15 further comprises refractory side walls 61. These, along with the bottom refractory 57, the threshold 31 and the exit lip 59, define a container for holding a pool of molten metal.

The upper portion of the chamber further includes a lintel 63 at its upstream end. This lintel 63 may be used as a means for supporting delivery means roof 39. Additionally, the upper portion of the chamber includes a ceiling or roof 65 preferably constructed of refractory material suitable for radiating or absorbing heat uniformly over the area facing the glass beneath it during operation. Extending through the ceiling of the forming chamber are controllable heating elements 67 used to control the rate of heat removal from the glass during forming. These heating elements are connected to bus bars (not shown) which are connected, in turn, to a source of power (not shown). The upper portion of the forming chamber 15 includes a top casing end wall which may extend over the glass removal or withdrawal facility 17 at the downstream end of the forming chamber 15. Alternatively, a separate hood may be provided over the glass removal facility 17. Disposed within the bottom container of the forming chamber is a pool of molten metal 69, preferably molten tin or an alloy of tin.

At the downstream end of the forming chamber is the glass removal facility 17 for withdrawing a continuous sheet of glass from the surface of the pool of molten metal 69 and for conveying a withdrawn sheet of glass from the forming chamber 15. The glass removal facility includes curtains 71 or other barriers or seals to segregate the headspace of the forming chamber from the outside environment. These are preferably flexible curtains of heat resistant cloth (e.g., asbestos) or the like. The glass removal facility further includes liftoff rolls 73 mounted in a position to lift and convey a glass sheet from the forming chamber. These rolls 73 are provided with seals 75, usually of graphite, to seal the bottom portion of the forming chamber from the outside environment.

When making flat glass using the apparatus described, a layer of molten glass 77 is delivered onto the molten metal 69 in the upstream end of the forming chamber. This glass is cooled and forces are imparted to the glass, for example, by the action of rolls 73. This causes the glass to advance along the surface of the pool of molten metal and to form a continuous sheet of glass that is dimensionally stable (that is, it assumes a stable thickness and width that is maintained as the glass is withdrawn from the forming chamber). The applicant recognizes that the term "bath" has at times been used in the art to mean the pool of molten metal on which the glass is formed and at other times to mean the forming chamber where the glass sheet formation takes place on the molten metal bath. However, in this specification, the applicant intends to refer to the structure as the forming chamber and only use the term "bath" to refer to the pool of molten metal. The terms "ribbon" and "sheet" are used interchangeably to refer to the strip of glass formed on the bath in the forming chamber.

Extending into the refractory 57 that forms the bottom of the forming chamber is the asymmetric cooler 82. The cooler is illustrated comprises a U-shaped conduit that is embedded in the refractory bottom of the forming chamber. While the conduit is illustrated as a U-shaped chamber, it is within the scope of the invention to utilize means and designs, such as a single conduit that has an inner and outer wall which would allow water circulation in through the inner conduit and out of the outside conduit such that only one pipe need be embedded in the refractory bottom.

The cooling of the invention may be provided at any portion of the molten metal where the longitudinal distortion caused by uneven transverse temperature of the molten metal at the glass metal interface is a difficulty. A preferred location is immediately prior to the area of solidification of the molten glass at the entry end of the forming chamber. The area preferred is that portion of the bath where the glass is undergoing changes in width and/or thickness. The glass in this area has not cooled to such an extent that it is no longer easily workable. It is theorized that the longitudinal defects result because transverse areas of the glass are not uniform in temperature due to the uneven molten bath temperature. The areas of uneven temperature form longitudinal defects because as the glass is stretched and elongated the areas of higher temperature stretch to a greater degree than the lower temperature areas. Therefore, it can be seen why the area of preferred location for the asymmetric cooling device is at the forming region where the most stretching and elongation of the glass is taking place.

Simulated model studies of a glass forming chamber employing glycerin as a molten metal stimulant and using methylene blue dye to trace the flow of molten metal stimulant indicates that the asymmetric cooling of the invention causes a non-symmetrical or asymmetric flow in the molten metal layer established beneath in advancing glass such that center line and other longitudinal distortion is alleviated. The molten tin in a forming chamber tends to be carried by interfacial friction along a path corresponding to that of the movement of the glass. To compensate for the surface molten metal which is moving along by frictional force with the glass being pulled through the forming chamber there is a corresponding return flow of molten metal along the lower portion of the molten metal bath. While it is known to utilize dams to isolate areas of the bath, the flow of metal continues between adjacent dams and further has a symmetrical transverse character on each side of the center line.

Figure 5:
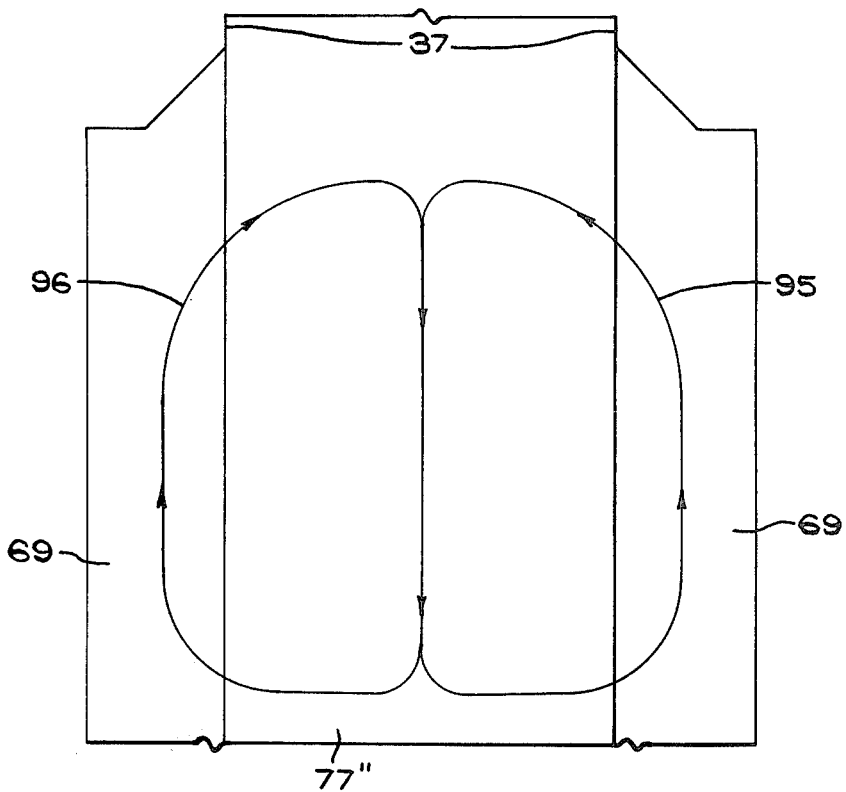
FIG. 5 is a partial plan view illustrating the current of the molten metal in a conventional float glass bath.
Figure 6:
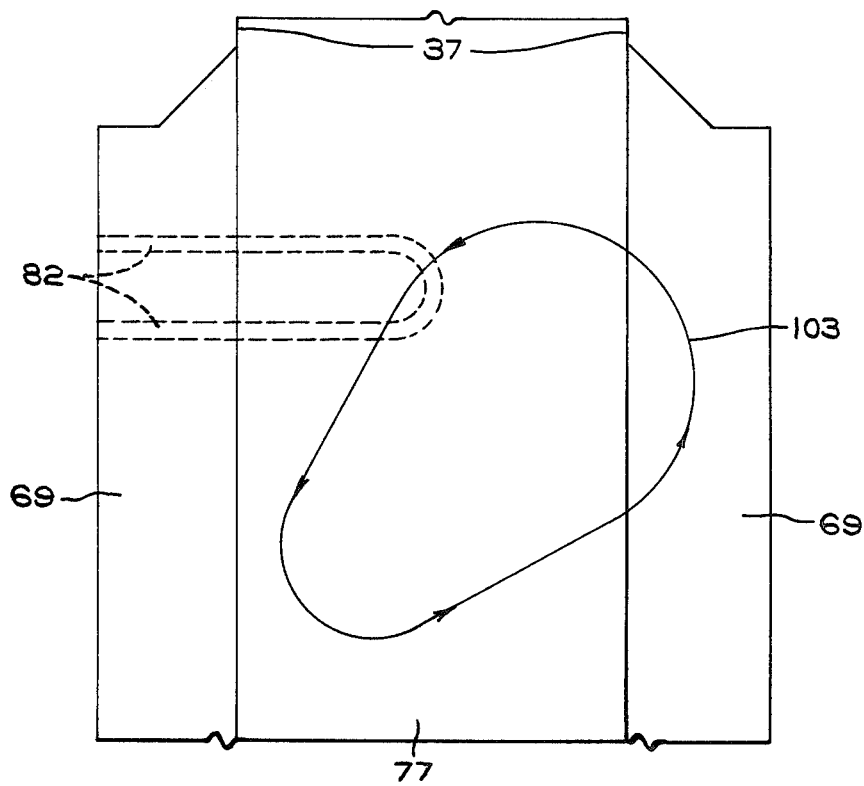
FIG. 6 illustrates the currents in the metal bath using the asymmetric cooling system of the instant invention.

The symmetrical transverse character of the molten metal flow in a forming chamber is illustrated by FIG. 5 wherein the flow of molten metal forms two roughly oval patterns converging at the center of the bath where the movement and temperature of the tin is greater and returning generally along the outer portions of the bath and lower in the bath. As can be readily understood, such a flow pattern contributes to an uneven glass temperature transverse of the direction of movement. In contrast, as illustrated by FIG. 6, the asymmetric cooling 82 of the invention results in a generally elliptical asymmetric current flow illustrated by arrows 103 below the advancing molten glass. Thus a single large elliptical pattern is induced in the section of the molten bath adjacent the cooling means 82.

Figure 7:
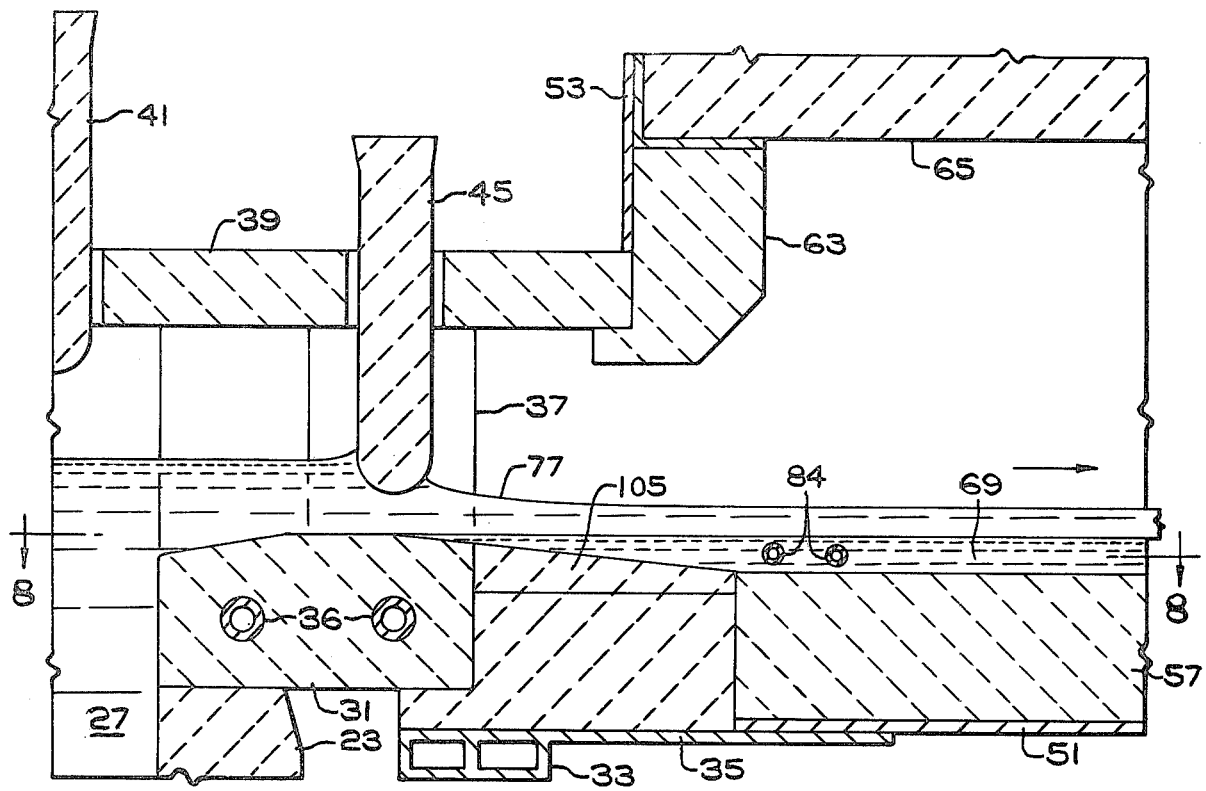
FIG. 7 is a partial sectional elevational view of the delivery facility and upstream end of a forming chamber illustrating an alternative location for a cooling device.
Figure 8:
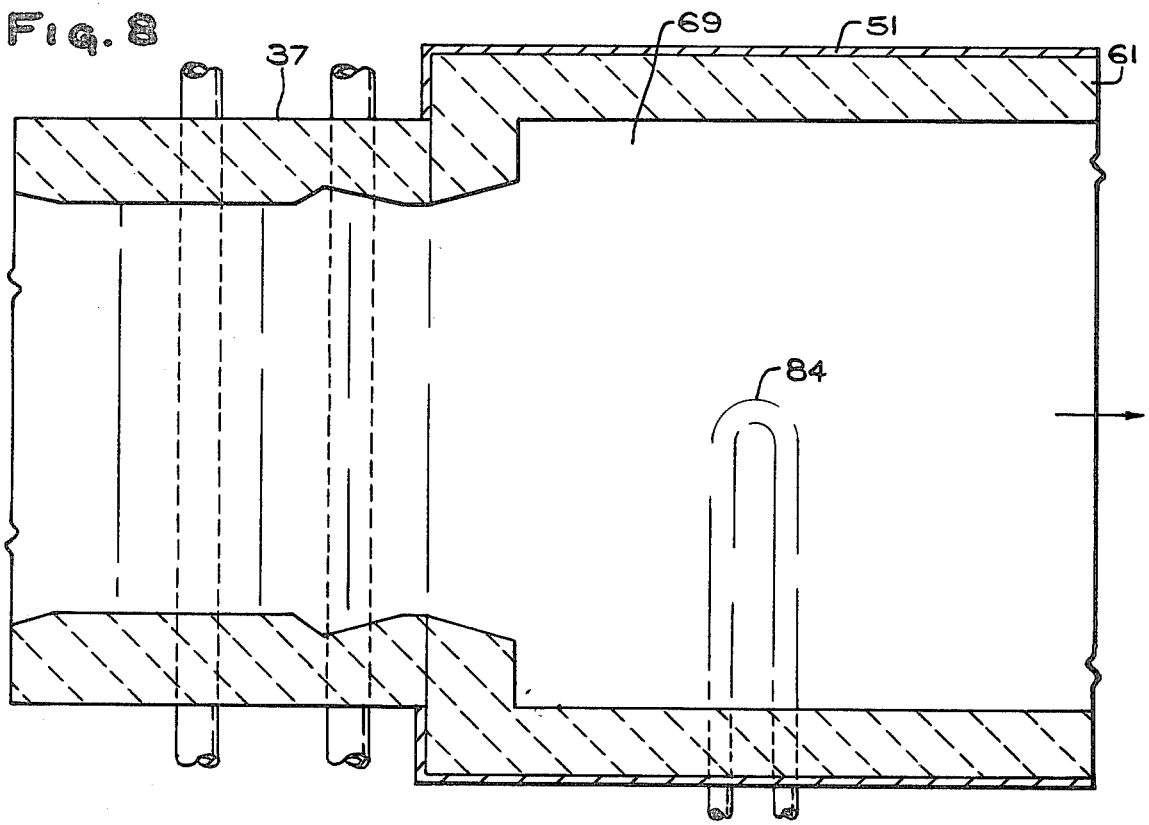
FIG. 8 is a partial sectional plan view of the chamber of FIG. 7 taken along the section line 8—8 of FIG. 7.

While the preferred cooling means of the invention has been described as a conduit in the refractory forming the bottom of the forming chamber. It is also suitable for the invention to utilize a conduit which is in the molten metal bath itself. Such an alternative configuration is illustrated in FIGS. 7 and 8 wherein the cooling means 84 is in direct contact with the molten metal bath. Use of such a cooling conduit in the molten bath of course creates flow patterns caused by the barrier which the conduit presents. Another alternate means of locating the cooling would be to embed the cooling conduit in the refractory bottom but exit the cooling conduit from the bottom of the furnace rather than from the side wall as is illustrated in the drawings. The invention requires that cooling be applied to the molten metal bath below the glass ribbon in an asymmetric manner with respect to centerline but the method of application of the cooling means to the molten metal may take various forms.

The dimensions of the conduit or other cooling means, or rate of coolant flow through the conduit and depth of the conduit within the refractory bottom may be varied depending on what results in the most reduction of longitudinal distortion in the particular forming chamber utilized. Other factors effecting the rate of cooling application are the size of the forming chamber, location of barriers or dams within the forming chamber and the through-put of glass through the forming chamber.

The invention has been described with the preferred embodiment of the invention with a single cooling area in the forming region. However, it is within the invention to have asymmetric cooling below the glass at other areas of the chamber to aid in prevention of center heat concentration. Further, cooling at different sides of the ribbon at successive locations could be utilized to provide asymmetric cooling in said bath at several points.

The present invention while described with respect to a particular delivery means of molten glass a float forming chamber is not limited to this particular delivery means. Alternatively the system of the invention may be utilized in combination with a delivery means such as described in U.S. Pat. No. 3,220,816 to Pilkington wherein the glass is delivered down along canal over a lip and caused to fall into a pool of molten metal wherein it is permitted to spread.

As will be apparent to those skilled in the art the present system may be modified and equivalent elements and processes may be employed in combination therewith without departing from the spirit of this invention. For instance, several cooling devices could be located within the forming chamber some directly in the molten metal and some embedded in the chamber bottom. Further the cooling system the invention embraces cooling means under the glass but which do not extend all the way to the center of the forming chamber.

Thus, the present disclosure of the preferred embodiments in the present invention is not intended to limit the scope of the applicants' invention.

We claim:

1. A chamber for forming a continuous sheet of glass comprising a tank having a bottom, side and end walls, said tank being adapted to contain a molten metal, means for depositing molten glass upon the surface of said molten metal at a first location in said tank adjacent one end wall thereof, means for removing said sheet of glass from the surface of said molten metal at a second location adjacent the other end wall thereof, cooler means mounted in said tank, said cooler means extending beneath the glass sheet across substantially half of the tank width from only one side thereof and being adapted to provide a flow of coolant at a rate sufficient to induce a transversely extending flow of molten meal in a direction toward said one side of said tank and thereby breaking up the characteristic longitudinal flow of the molten metal in the tank along the centerline thereof whereby the normal currents of flow of the molten metal are sufficiently altered so as to alleviate the concentration of heat in the molten metal along the centerline of the tank.

2. The chamber of claim 1 wherein said cooling means are embedded in the bottom of the tank in said chamber.

3. The chamber of claim 1 wherein said cooling means are in contact with the molten metal in said tank.

4. The chamber of claim 1 wherein said cooling means comprises a conduit embedded in a refractory comprising the bottom of the tank containing said molten metal.

5. In a flat glass-forming chamber including an enclosed chamber containing a pool of glass-supporting molten metal supported by a bottom of a tank in said chamber, means for delivering molten glass onto the pool of molten metal at an inlet end, means for removing a continuous sheet of glass from the pool of molten metal and from the chamber at an outlet end, means for advancing glass along the surface of the molten metal from the inlet end to the outlet end of the chamber while forming it into a continuous sheet of desired width and thickness and means for removing heat from the glass during its advance and for removing heat from the chamber, the improvement which comprises: cooler means mounted in said chamber, said cooler means extending beneath the glass sheet across substantially half of the chamber width from only one side thereof and being adapted to provide a flow of coolant at a rate sufficient to induce a transversely extending flow of molten metal in a direction toward said one side of said chamber and thereby breaking up the characteristic longitudinal flow of the molten metal in the chamber along the centerline thereof whereby the normal currents of flow of the molten metal are sufficiently altered so as to alleviate the concentration of heat in the molten metal along the centerline of the chamber.

6. The chamber of claim 5, wherein said cooling means is embedded in the bottom of the tank in said chamber.

7. The chamber of claim 5 wherein said cooling means is directly in contact with said molten metal.

8. In a method of reducing longitudinal defects in the making of flat glass comprising the steps of delivering molten glass onto the surface of a pool of molten metal in an enclosed forming chamber, advancing the glass in a layer along a path on the surface of the pool of molten metal from an inlet region to an outlet region while cooling the continuous sheet of glass and removing the continuous sheet of glass from the surface of the pool of molten metal and from the forming chamber wherein the molten metal upon which the glass advances has flows within it along paths which are at least partially aligned with the path of glass advance, including both flows with and flows counter to the advance of the glass, the improvement which comprises cooling said molten metal transversely selectively by passing a coolant beneath the glass sheet along a closed path extending substantially half of the width of the forming chamber from only one side thereof and maintaining a flow of said coolant at a rate sufficient to induce a transversely extending flow of molten metal in a direction toward said one side of said chamber and thereby breaking up the characteristic longitudinal flow of molten metal in the chamber along the centerline thereof whereby the normal currents of flow of the molten metal are sufficiently altered so as to alleviate the concentration of heat in the molten metal along the centerline of the forming chamber.

9. The method of claim 8 wherein said cooling is carried out in the forming region of said bath.

10. The method of claim 8 wherein said cooling is carried out by cooling the bottom of said chamber.

11. The method of claim 8 wherein said cooling is carried out immediately prior to the area of solidification of said glass.

* * * * *